United States Patent
Ancajas et al.

(10) Patent No.: US 10,193,827 B2
(45) Date of Patent: Jan. 29, 2019

(54) HOT CARRIER INJECTION TOLERANT NETWORK ON CHIP ROUTER ARCHITECTURE

(71) Applicants: Dean Michael Ancajas, Logan, UT (US); Koushik Chakraborty, Logan, UT (US); Sanghamitra Roy, Logan, UT (US)

(72) Inventors: Dean Michael Ancajas, Logan, UT (US); Koushik Chakraborty, Logan, UT (US); Sanghamitra Roy, Logan, UT (US)

( * ) Notice: Subject to any disclaimer, the term of this patent is extended or adjusted under 35 U.S.C. 154(b) by 14 days.

(21) Appl. No.: 15/383,138

(22) Filed: Dec. 19, 2016

(65) Prior Publication Data
US 2017/0099236 A1    Apr. 6, 2017

Related U.S. Application Data

(63) Continuation-in-part of application No. 14/056,804, filed on Oct. 17, 2013.

(60) Provisional application No. 61/865,304, filed on Aug. 13, 2013.

(51) Int. Cl.
*H04L 12/40* (2006.01)
*H04L 12/933* (2013.01)
*H04L 12/935* (2013.01)

(52) U.S. Cl.
CPC ............ *H04L 49/109* (2013.01); *H04L 49/15* (2013.01); *H04L 49/3018* (2013.01); *H04L 49/3045* (2013.01)

(58) Field of Classification Search
None
See application file for complete search history.

(56) References Cited

U.S. PATENT DOCUMENTS

| | | |
|---|---|---|
| 6,714,081 B1 | 3/2004 | Xu |
| 8,223,650 B2 | 7/2012 | Kumar |
| 8,391,281 B2 | 3/2013 | Paul |
| 8,549,363 B2 | 10/2013 | Cher |
| 9,094,231 B2 | 7/2015 | Yoshida |
| 9,344,358 B2 | 5/2016 | Bhardwaj |
| 2008/0186998 A1 | 8/2008 | Rijpkema |
| 2008/0205432 A1 | 8/2008 | Gangwal |

(Continued)

OTHER PUBLICATIONS

Bertolini, C., et al., Relation between HCI-induced performance degradation and applications in a RISC processor, On-Line Testing Symposium, 2012 IEEE 18th International, 2012, p. 67-72.

(Continued)

*Primary Examiner* — Alpus Hsu

(57) ABSTRACT

For a hot carrier injection tolerant network on chip (NoC) router architecture, a plurality of input buffers receives a plurality of input data bits. A plurality of multiplexers shuffles the plurality of input data bits to output a plurality of shuffled input buffer data bits. A coupling module switches first input buffer data bits at the plurality of input buffers from first shuffled input buffer data bits to second shuffled input buffer data bits using the plurality of multiplexers. A selector selects, using a plurality of decoders, a virtual channel path to a virtual channel of the plurality of virtual channels for the shuffled input buffer data bits. A connection module switches the second shuffled input buffer data bits from a first virtual channel to a second virtual channel of the plurality of virtual channels using the plurality of decoders.

20 Claims, 17 Drawing Sheets

(56) References Cited

U.S. PATENT DOCUMENTS

2014/0156929 A1 6/2014 Falsafi
2014/0177648 A1 6/2014 Kumar
2014/0376569 A1 12/2014 Philip

OTHER PUBLICATIONS

Bhardwaj, K., et al., An MILP based agging aware routing algorithm for NoCs, Design, Automation & Test in Europe Conference & Exhibition, 2012, p. 326-331.
Bhardwaj, K., et al., Towards graceful aging degradation in NoCs through an adaptive routing algorithm, Design Automation Conference, 2012 49th ACM/EDAC/IEEE, 2012, p. 382-391.
Bienia, C., et al., The PARSEC benchmark suite: Characterization and architectural implications, PACT '08, Proceedings of the 17th International Conference on Parallel Architectures and Compliation Techniques, 2008, p. 72-81.
Binkert, A., et al., The gem5 simulator, ACM SIGARCH Computer Architecture News, May 2011, vol. 39, iss. 2, p. 1-7.
Bravaix, A., et al., Hot-Carrier acceleration factors for low power management in DC-AC stressed 40nm NMOS node it high temperature, REliability Physics Symposium, 2009 IEEE International, Apr. 2009, p. 531-548.
Choudhary, N., et al., FabScalar: Composing synthesizable RTL designs of arbitrary cores within a canonical superscalar template, ISCA '11 Proceedings of the 38th Annual International Symposium on Computer Architecture, p. 11-22.
Das, R., et al., Performance and power optimization through data compression in Network-on-Chip architectures, High Performance Computer Architecture, IEEE 14th International Symposium, 2008, p. 215-225.
Fick, D., et al., Vicis: A reliable netowrk for unreliable silicon, Design Automation Conference, DAC '09, 46th ACM/IEEE, 2009, p. 812-817.
Fu, X., et al., Architecting reliable multi-core network-on-chip for small scale processing technology, 2010 IEEE/IFIP International Conference on Dependable Systems & Networks, 2010, p. 111-120.
Gupta, S., et al., StageNetSlice: a reconfigurable microarchitecture building block for resilient CMP systems, CASES 08 Proceedings of the 2008 international conference on Compilers, architectures and synthesis for embedded systems, 2008, p. 1-10.
Hesness, J., et al., Netrace: dependency-driven trace-based network-on-chip simulation, NoCArc '10 Proceedings of the Third International Workshop on Network on Chip Architectures, 2010, p. 31-36.
Kamal, M. et al. An efficient reliability simulation flow for evaluating the hot carrier injection effect in CMOS VLSI circuits, Computer Design, 2012 IEEE 30th International Conference, 2012, p. 352-357.
Kim, J., et al., A Gracefully Degrading and Energy-Efficient Modular Router Architecture for On-Chip Networks, Computer Architecture, 33rd International Symposium, 2006, p. 4-15.
Kufluoglu, H., Mosfet degradation due to NBTI and HCI and its implications for reliability-aware VLSI design, PhD Thesis, Purdue University, 2007. pp. intro and 1-75.
Kufluoglu, H., Mosfet degradation due to NBTI and HCI and its implications for reliability-aware VLSI design, PhD Thesis, Purdue University, 2007. pp. 76-172.
Kundu, P., On-die interconnects for next generation CMPs, OCIN Workshop, 2006.
Lorenz, D., Aging analysis at gate and macro cell level, Computer-Aided Design (ICCAD), 2010 IEEE/ACM International Conference, 2010, p. 77-84.
Nigam, T., et al., Accurate product lifetime predictions based on device-level measurements, Reliability Physics Symposium, 2009 IEEE international, 2009, p. 634-639.
Park, D., et al., Exploring Fault-Tolerant Network-on-Chip Architectures, Dependable Systems and Networks, DSN 2006, 2006, p. 93-104.
Siddiqua, T., et al., Enhancing NBTI Recovery in SRAM Arrays Through Recovery Boosting, Very Large Scale Integration (VLSI) Systems, IEEE Transactions, 2012, vol. 20, iss. 4, p. 616-629.
Takeda, E., et al., An empirical model for device degradation due to hot-carrier injection, Electron Device Letters, IEEE, 1983, vol. 4, iss. 4, p. 111-113.
Wang, W., et al., Compact modeling and simulation of circuit reliability for 65-nm CMOS technology, IEEE Transactions on Device and Materials Reliability, 2007, vol. 7, iss. 4, p. 509-517.
Zhao, W., et al., Predictive Technology Model, http://ptm.asu.edu/, accessed Dec. 23, 2011.
Becker, D., et al., Open source NoC router RTL, https://nocs.stanford.edu/cgi-bin/trac.cgi/wiki/Resources/Router, accessed Dec. 23, 2013.
USPTO, Non-final Office Action for U.S. Appl. No. 14/056,804, filed Oct. 17, 2013, dated Mar. 7, 2016.
USPTO, Applicant-Initiated Interview Summary for U.S. Appl. No. 14/056,804, filed Oct. 17, 2013, dated Jul. 11, 2016.
Thorpe, Scott D., Amendment and Response to Office Action for U.S. Appl. No. 14/056,804, filed Oct. 17, 2013, Submitted Date Jul. 20, 2016.
USPTO, Final Office Action for U.S. Appl. No. 14/056,804, filed Oct. 17, 2013, dated Aug. 5, 2016.
Thorpe, Scott D., Telephone Interview Agenda for U.S. Appl. No. 14/056,804, filed Oct. 17, 2013, Submitted Date Sep. 21, 2016.
USPTO, Applicant-Initiated Interview Summary for U.S. Appl. No. 14/056,804, filed Oct. 17, 2013, dated Mar. 26, 2016.

HOT CARRIER INJECTION TOLERANT NETWORK ON CHIP ROUTER ARCHITECTURE

CROSS-REFERENCE TO RELATED APPLICATIONS

This is a continuation-in-part application of and claims priority to U.S. patent application Ser. No. 14/056,804 entitled "ROUTER ARCHITECTURE" and filed on Oct. 17, 2016 for Dean Michael Ancajas et al., which is incorporated herein by reference, which claims priority to U.S. Provisional Patent Application No. 61/865,304 entitled "Hot Carrier Injection Tolerant Network on Chip Router Architecture" and filed on Aug. 13, 2013 for Dean Michael Ancajas et al., which is incorporated herein by reference.

This invention was made with government support under contract CNS-1117425 and CAREER-1253024 awarded by the National Science Foundation. The government has certain rights in the invention.

FIELD

The subject matter disclosed herein relates to network-on-chip (NoC) router architectures and more particularly relates to hot carrier injection (HCI) tolerant NoC router architectures.

BACKGROUND

Description of the Related Art

NoC router architectures are often used for multiple core semiconductor devices. Unfortunately, some elements of a NoC router may degrade and fail earlier than other elements due to HCI as charge carriers are trapped in gate dielectrics. As a result, the overall life of the device is reduced.

BRIEF SUMMARY

An apparatus is disclosed for a hot carrier injection tolerant NoC router architecture. A plurality of input buffers receives a plurality of input data bits. A plurality of multiplexers shuffles the plurality of input data bits to output a plurality of shuffled input buffer data bits. A coupling module comprises semiconductor gates and switches first input buffer data bits of the plurality of input data bits at the plurality of input buffers from first shuffled input buffer data bits to second shuffled input buffer data bits using the plurality of multiplexers in response to reaching an end of a time interval to reduce hot carrier injection for a NoC node comprising the plurality of input buffers, a selector, and a plurality of virtual channels. The selector comprises semiconductor gates and receives the plurality of shuffled input buffer data bits at a plurality of decoders and selects, using the plurality of decoders, a virtual channel path to a virtual channel of the plurality of virtual channels for the shuffled input buffer data bits. A connection module comprises semiconductor gates and switches the second shuffled input buffer data bits from a first virtual channel to a second virtual channel of the plurality of virtual channels using the plurality of decoders in response to reaching the end of the time interval to reduce the hot carrier injection for the NoC node. A method and NoC performing the functions of the apparatus are also disclosed.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements. Ancajas, Dean Michael et al., "HCI-Tolerant NoC Router Microarchitecture" (Ancajas) is incorporated herein by reference in its entirety.

Figure 1:
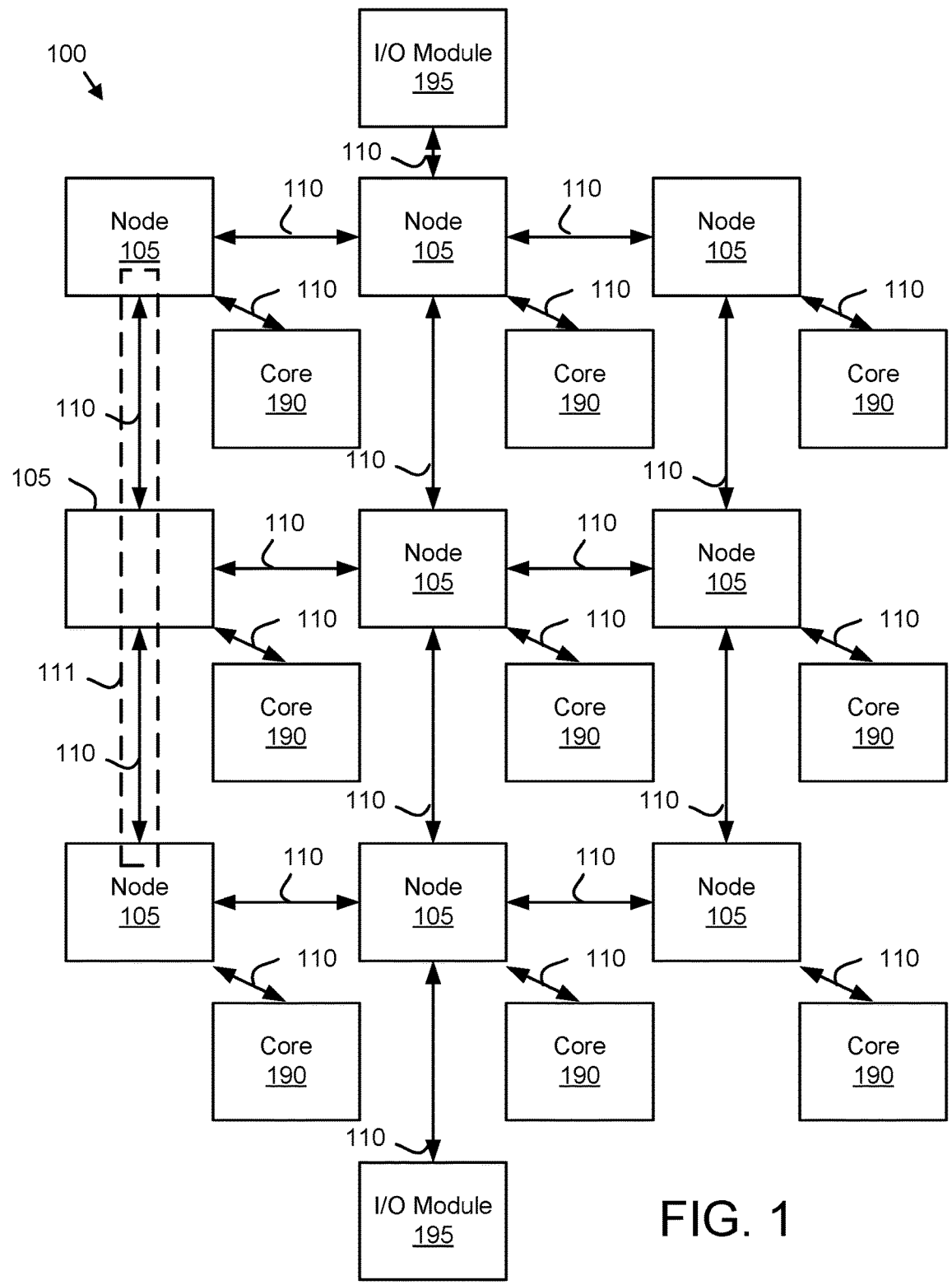
FIG. 1 is a schematic block diagram illustrating one embodiment of a NoC.

FIG. 1 is a schematic block diagram illustrating one embodiment of an NoC 100. The NoC 100 includes a plurality of nodes 105 and a plurality of cores 190. The cores 190 may include one or more processor cores, one or more specialized processing units, one or more memories, or combinations thereof.

The nodes 105 are coupled to connecting wires 110. Data may be communicated between the nodes 105. In one embodiment, data is communicated between cores 190 and/or input/out modules 195 through the nodes 105 and connecting wires 110. The paths followed by the input buffer data bits 125 through connecting wires 110, nodes 105, cores 190, and input/output nodes 195 may comprise an NoC data channel 111. NoC data channels 111 may connect two or more nodes 105, cores 190, and input/output modules 195. As a result, the NoC 100 provides a highly flexible architecture.

When semiconductor gates of elements of the NoC 100 switch frequently and/or carry current, HCI is more likely. As a result, charge carriers may be trapped within a gate dielectric of an element. The trapping of charge carriers in gate dielectrics may damage and/or destroy the ability of a semiconductor gate to switch. As a consequence, the gate fails, preventing the NoC element from functioning and degrading and/or terminating operations of the NoC device 100.

Unfortunately, some gates may consistently switch frequently and/or carry current because of the data values that those gates carry while other gates switch and/or carry current much less frequently. The embodiments described herein balances switching and/or current carrying in element gates to reduce HCI and extend the life of the element gates and the NoC device 100 as will be described hereafter.

Figure 2A:
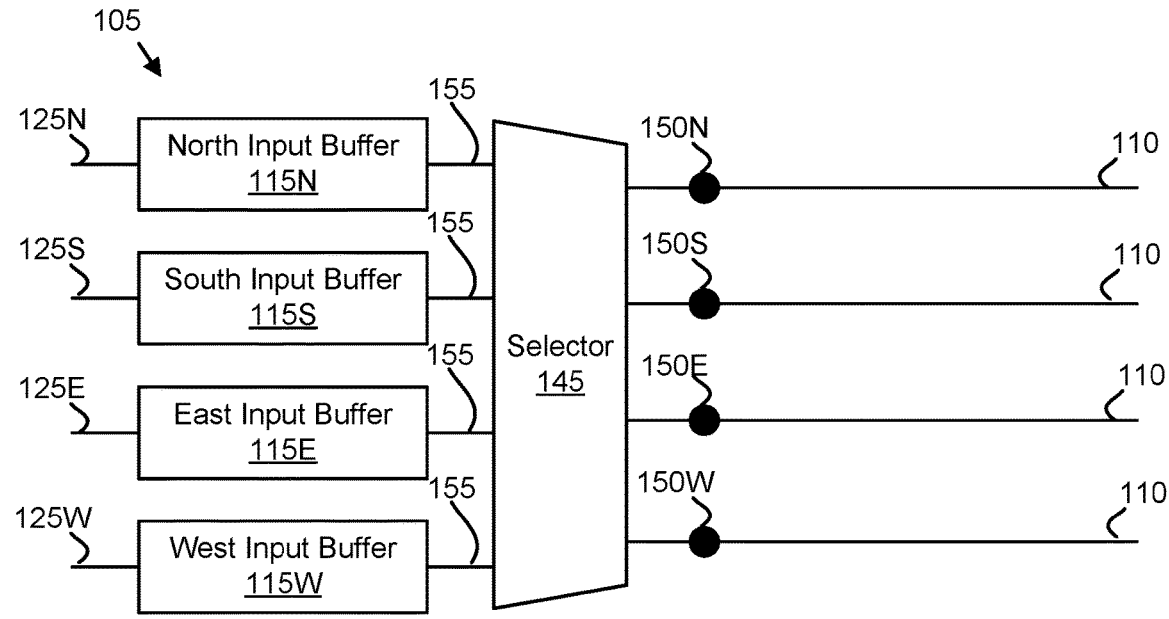
FIG. 2A is schematic block diagram illustrating one embodiment of a node.

FIG. 2A is a schematic block diagram illustrating one embodiment of a node 105. The node 105 includes one or more input buffers 115, a selector 145, and one or more connection points 150 from the selector 145 to the connecting wires 110.

The connection points 150 each connect to one connecting wire 110. The input buffers 115 receive input values from a core 190, a connecting wire 110, or the like. The input values are encoded as input buffer data bits 125. The input buffers 115 generate shuffled input buffer data bits 155. FIG. 2A depicts the input buffer 115 communicating the shuffled input buffer data bits 155 through the selector 145 to a connection point 150. The shuffled input buffer data bits 155 are then communicated over the connecting wires 110 to another node 105.

Figure 2B:
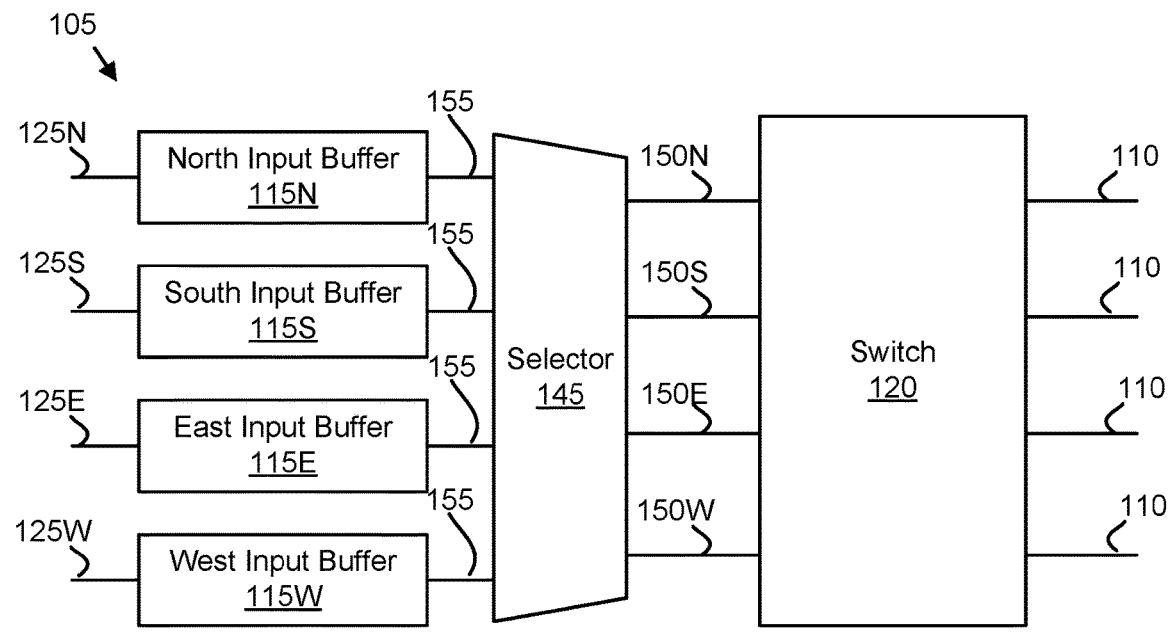
FIG. 2B is a schematic block diagram illustrating one alternate embodiment of a node.

FIG. 2B is a schematic block diagram illustrating one alternate embodiment of a node 105. FIG. 2B depicts the input buffer data bits 125 being communicated through the input buffer 115, the selector 145, the connection points 150, and a switch 120 to the connecting wires 110. In one embodiment, the switch 120 is a crossbar switch.

The connecting wires 110 may carry the data values of the input buffer data bits 125 to the input buffer 115 of another node 105. The paths followed by the input buffer data bits 125 may comprise the NoC data channel 111. In the depicted embodiments, the input buffer data bits 125 include north input buffer data bits 125N, south input buffer data bits 125S, east input buffer data bits 125E, and west input buffer data bits 125W. The selector 145 may route input buffer data bits 125 from any of the input buffers 145 to any of the connection points 150 as will be described hereafter. For example, the selector 145 may route north input buffer data bits 125N to the south connection point 150S, the east connection point 150E, or the west connection point 150W.

Figure 3:
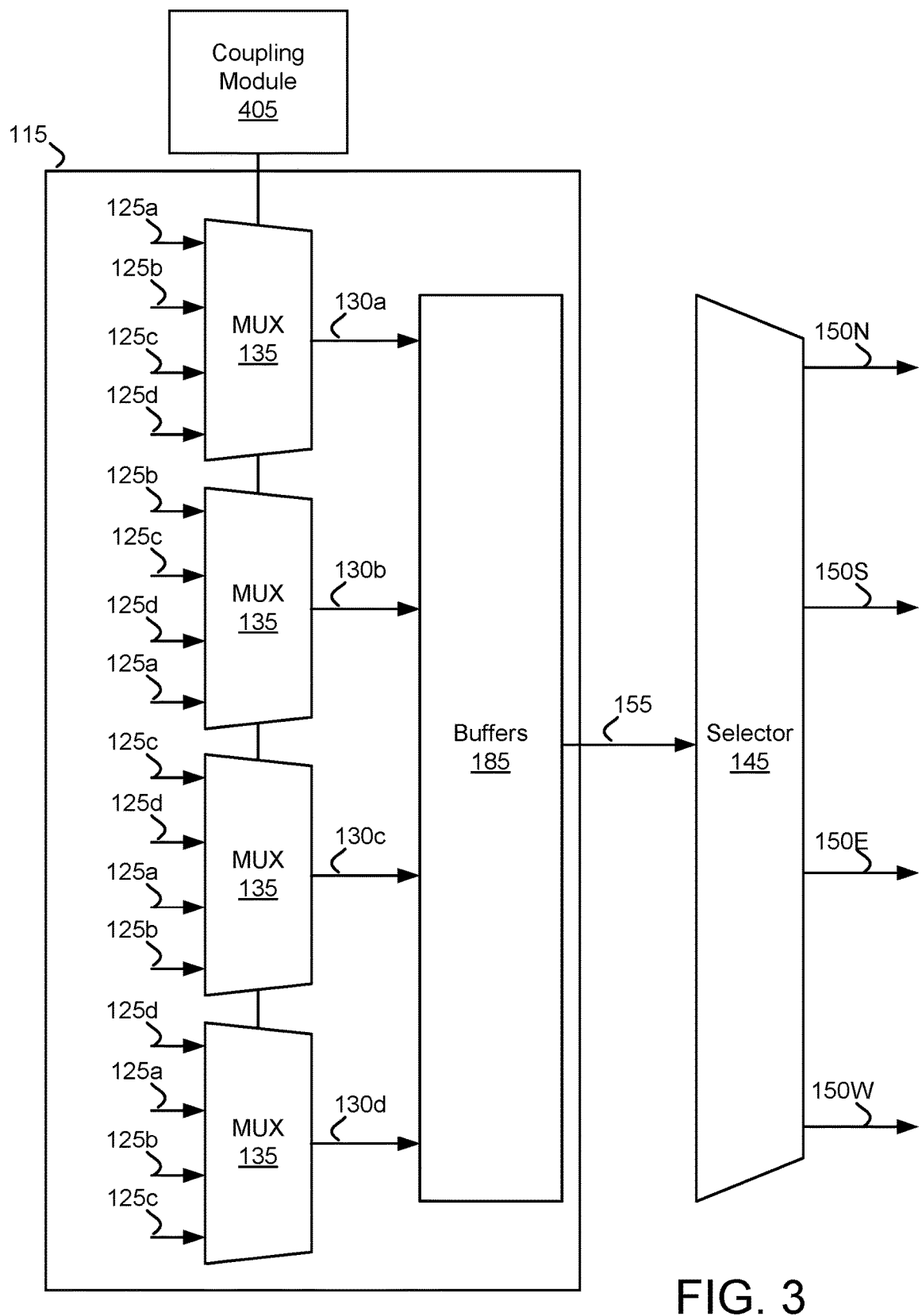
FIG. 3 is a schematic block diagram illustrating one embodiment of an input buffer.

FIG. 3 is a schematic block diagram illustrating one embodiment of an input buffer 115. The input buffer 115 may modify the couplings of the input buffer data bits 125 to the selector 145, the connection points 150, and ultimately to the connecting wires 110. The input buffer includes the input buffer data bits 125, one or more multiplexers 135, one or more multiplexer outputs 135, buffers 185, and shuffled input buffer data bits 155. In the depicted embodiment, the input buffer data bits 125 are divided into four groups, a first input buffer data bit group 125a, a second input buffer data bit group 125b, a third input buffer data bit group 125c, and a fourth input buffer data bit group 125d. Each input buffer data bit groups 125a-d may have a same number of bits. One of skill in the art will recognize that the embodiments may be practiced with any number of input buffer data bit groups.

Input buffer data bit groups 125a-d may be received at the multiplexers 135. A coupling module 405 may assert signals that select one of the input buffer data bit groups 125a-d at each multiplexer 135. The selected input buffer data bit groups 125a-d at each multiplexer 135 are communicated through multiplexer outputs 130 to the buffer 185. The buffer 185 outputs shuffled input buffer data bits 155. The selector 145 may further communicate the shuffled input buffer data bits 155 to the connecting wires 110 and/or to the switch 120.

The coupling module 405 modifies the couplings of the input buffer data bits 125 to the connecting wires 110. For example, for 16-bit input buffer data groups 125a-d, the shuffled input buffer data bits 155 may be shuffled relative to the input buffer data bits 155 as illustrated in Table 1.

TABLE 1

| | Input Buffer Data Bits | | | |
|---|---|---|---|---|
| Multiplexer Selection | 63-58 | 32-47 | 31-16 | 15-0 |
| | Shuffled Input Buffer Data Bits | | | |
| 0 | 63-58 | 32-47 | 31-16 | 15-0 |
| 1 | 32-47 | 31-16 | 15-0 | 63-58 |
| 2 | 31-16 | 15-0 | 63-58 | 32-47 |
| 3 | 15-0 | 63-58 | 32-47 | 31-16 |

As a result, the coupling of the input buffer data bits 125 to the buffer 185, selector 145, connection points 150, and connecting wires 110 are shuffled as shuffled input bits 155 so that the same input buffer data bits 125 are not communicated over the same NoC data channel bits. As a result, frequently switching and/or current carrying input data buffer bits 125 are balanced across the paths of the NoC data channel 111.

The input buffer 115 may be the north input buffer 115N, the south input buffer 115S, the east input buffer 115E, or the west input buffer 115W. As a result, the shuffled input buffer data bits 155 may be the north shuffled input buffer data bits 155N, the south shuffled input buffer data bits 155S, the east shuffled input buffer data bits 155E, and the west shuffled input buffer data bits 155W.

Figure 4:
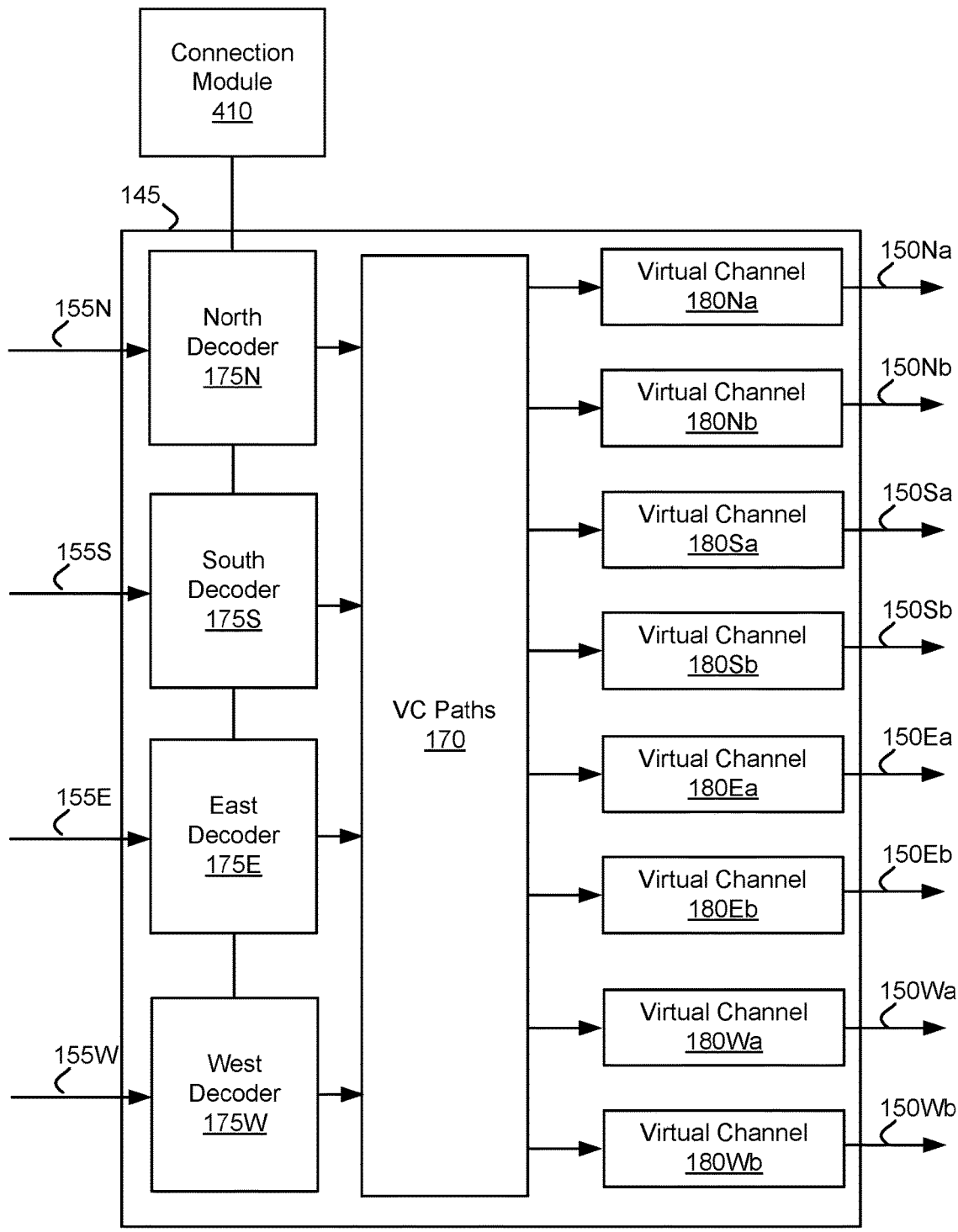
FIG. 4 is a schematic block diagram illustrating one embodiment of a selector.

FIG. 4 is a schematic block diagram illustrating one embodiment of a selector 145. The selector 145 includes one or more decoders 175, virtual channel paths 170, and one or more virtual channels 180. A connection module 410 may employ the selector 145 to modify the connection points 150 of the input buffer 115 to the connecting wires 110.

The selector 145 receives shuffled input buffer data bits 155 at the decoders 175. For example, a north decoder 175N may receive north shuffled input buffer data bits 155N, a south decoder 175S may receive south shuffled input buffer data bits 155S, an east decoder 175E may receive east shuffled input buffer data bits 155E, and a west decoder 175W may receive west shuffled input buffer data bits 155W.

The virtual channels 180 handle multiple concurrent streams of input values. Each virtual channel 180 waits for a turn to use the connecting wires 110 and/or switch 120. Each decoder 175 selects a virtual channel path 170 to a virtual channel 180. Each decoder 175 may select a virtual channel path 170 through to any virtual channel 180. In one embodiment, the virtual channels 180 request access to the connection points 150 and the switch 120 or connecting wires 110. The virtual channels 180 may request access each clock cycle. When one of virtual channels 180 is granted access, that virtual channel 180 communicates the shuffled input buffer data bits 155 to the switch 120 or the connecting wires 110.

The connection module 410 may assert signals to direct the decoders 175 to modify the virtual channel paths 170 and virtual channels 180 used to transport the shuffled input buffer data bits 155 to connection points 150 to the connecting wires 110 and/or to the switch 120. In one embodiment, the connection module 410 may balance frequently switching and/or current carrying input data buffer bits 125 across the paths of the NoC data channel 111. Table 2 illustrates some possible combinations of virtual channels 180 and input buffers 115. For simplicity, only an illustrative portion of the combinations are shown. In Table 2, the first digit refers to a number of the virtual channel 180 and a second letter refers to "north," "south," "east," and "west."

| Virtual Channel Path Selection | North Decoder | South Decoder | East Decoder | West Decoder |
|---|---|---|---|---|
| 0 | 1N | 1S | 1E | 1W |
| 1 | 2S | 2E | 2W | 2N |
| 2 | 1E | 1W | 1N | 1S |
| 3 | 2W | 2N | 2S | 2E |
| ... | ... | ... | ... | ... |
| 255 | 2W | 2E | 2S | 2N |

Thus, any decoder 175 may route the shuffled input data buffer bits 155 through any virtual channel 180 to a desired connection point 150.

Figure 5:
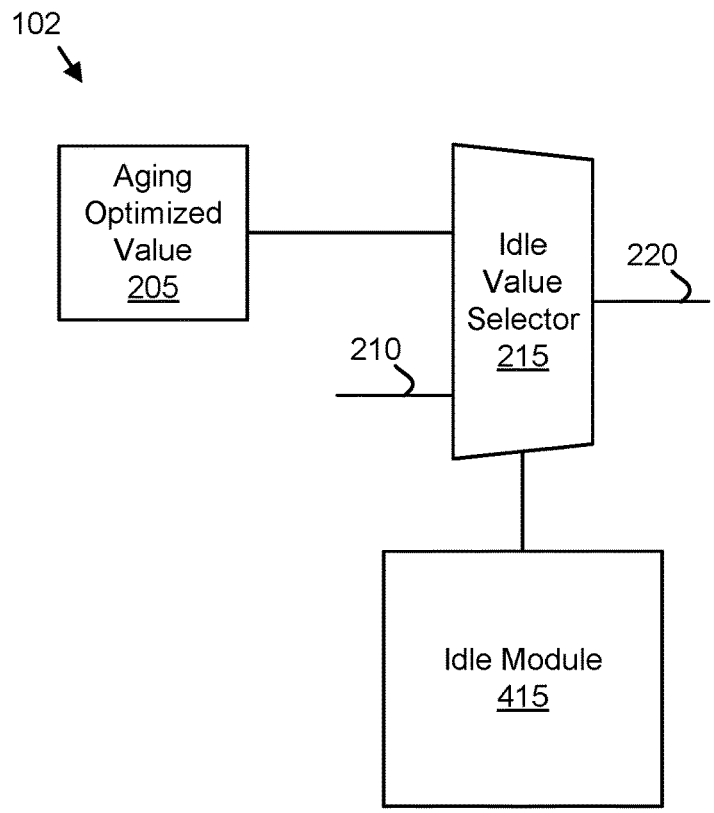
FIG. 5 is a schematic block diagram illustrating one embodiment of an idle circuit.

FIG. 5 is a schematic block diagram illustrating one embodiment of an idle circuit 102. The idle circuit 102 includes an aging optimized value 205, an idle value selector 215, and an idle module 415.

The aging optimized value 205 may be identified during an off-line analysis of data traffic within the NoC 100. The analysis may be a simulated analysis. The aging optimized value 205 may be selected reduce transistor aging in the NoC data channel 111 when transmitted in place of an idle data value during an idle cycle. In one embodiment, the aging optimized value is selected to reduce HCI. The aging optimized value may be selected to reduce switching. Alternatively, the aging optimized value may be selected to reduce asserted signals. In a certain embodiment, the aging optimized value is selected to reduce de-asserted signals.

The aging optimized value 205 may be transmitted to the idle value selector 215 from a register storing the aging optimized value 205. The idle value selector 215 may be a multiplexer controlled by the idle module 415.

The idle module 415 may detect an idle cycle for an NoC data channel 111. The idle cycle may be detected for the input buffers 115, the multiplexers 135, the decoders 175, the virtual channel paths 170, the virtual channels 180, the elements of the switch 120, and/or the connecting wires 110. In addition, the idle cycle may be detected for the switch 120. In one embodiment, the idle module 415 detects the idle cycle when no active data values are transmitted over a specified portion of the NoC data channel 111.

In one embodiment, an idle input 210 receives signals encoding data values in the NoC data channel 111 and an idle output 220 transmits the signals. If the idle module 415 does not detect an idle cycle, the data values are transmitted by the idle values selector 215 from the idle input 210 to the idle output 220. However, if the idle module 415 detects the idle cycle, the idle values selector 215 transmits the aging optimized value 205 from the idle output 220 instead of data values of the idle input 210. As a result, the aging optimized value 205 is transmitted in place of an idle value, reducing transistor aging.

Figure 6:
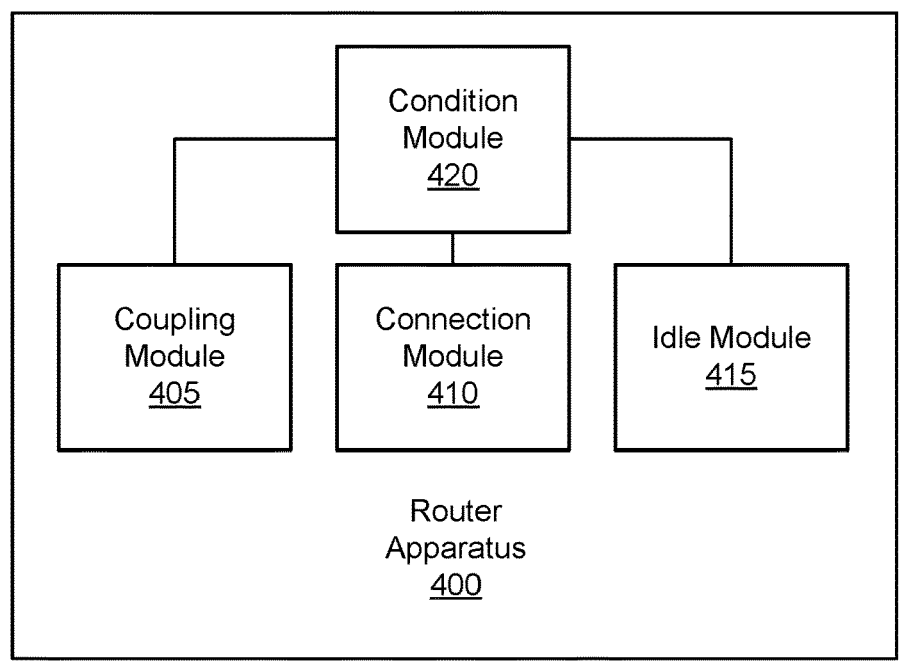
FIG. 6 is a schematic block diagram illustrating one embodiment of a router apparatus.

FIG. 6 is a schematic block diagram illustrating one embodiment of a router apparatus 400. The apparatus 400 includes a coupling module 405, a connection module 410, an idle module 415, and the condition module 420. The coupling module 405, the connection module 410, the idle module 415, and the condition module 420 may each comprise a plurality of semiconductor gates. In addition, the coupling module 405, the connection module 410, the idle module 415, and the condition module 420 may comprise a computer readable storage medium storing program code and executed by a processor.

The coupling module 405 may modify couplings of input buffer data bits 125 to the switch 120 and/or the connecting wires 110 in the NoC data channel 111. For example, least significant input buffer data bits 125 may first be routed through the least significant bits of the connecting wire 110 and/or switch 120, and subsequently routed through the most significant bits of the connecting wire 110 and/or switch 120 by modifying the input buffer data bits 125 selected by each of the multiplexers 135 as illustrated in Table 1. In one embodiment, couplings of the input buffer data bits 125 to the connecting wires 110 and/or switch 120 are regularly modified. In one embodiment, the couplings of the input buffer data bits 125 to the connecting wires 110 and/or switch 120 are modified when a modification condition is satisfied.

The connection module 410 may modify the connection points 150 of an input buffer 115 to the connecting wires 110 and/or switch 120. For example, the north input buffer data bits 125N of the north input buffer 115N may be routed through the north connection points 150N, the south connection points 150S, the east connection points 150E, or the west connection points 150W. Thus, data transfer and switching may be balanced across the connecting wires 110 and/or elements of the switch 120. The connection points 150 of the input buffer 115 to the connecting wires 110 and/or switch 120 may be regularly modified. In one embodiment, the connection points 150 of the input buffer 115 to the connecting wires 110 and/or switch 120 are modified when the modification condition is satisfied.

The idle module 415 may detect an idle cycle for a monitored NoC data channel element such as input buffers 115, decoders 175, virtual channels 180, elements of the switch 120, and/or connecting wires 110. An idle cycle may be one or more clock cycles during which no data value, also referred to as an idle data value, is transferred through one or more of the input buffer 115, selector 145, and/or switch 120. The idle module 415 may transmit the age optimizing value 205 in place of the idle data value to the input buffer 115, the selector 145, and/or switch 120 in response to detecting the idle cycle for the input buffer 115, decoder 175, virtual channel 180, element of the switch 120, and/or connecting wire 110. Alternatively, the idle module 415 may transmit the age optimizing value 205 in place of the idle data value to an element of the input buffer 115, the selector 145, and/or switch 120 in response to detecting the idle cycle for the input buffer 115, decoder 175, virtual channel 180, element of the switch 120, and/or connecting wire 110.

The condition module 420 determines if the modification condition is satisfied. If the modification condition is satisfied, the condition module 420 may direct the coupling module 405 to modify couplings of input buffer data bits 125 to the switch 120 and/or the connecting wires 110 in the NoC data channel 111. In addition, if the modification condition is satisfied, the condition module 420 may direct the connection module 410 to modify the connection points 150 of an input buffer 115 to the connecting wires 110 and/or switch 120. In one embodiment, if the modification condition is satisfied, the condition module 420 may direct the idle module 415 to detect an idle cycle for a monitored NoC data channel element.

In one embodiment, the modification condition is an epoch boundary. An epoch may be a specified time interval, a specified number of clock cycles, a specified amount of data transferred, or the like. The epoch boundary may be a start of an epoch, an end of an epoch, an epoch midpoint, or the like.

Alternatively, the modification condition may be an operational change. In a certain embodiment, the modification condition is satisfied by maintenance operation.

Figure 7:
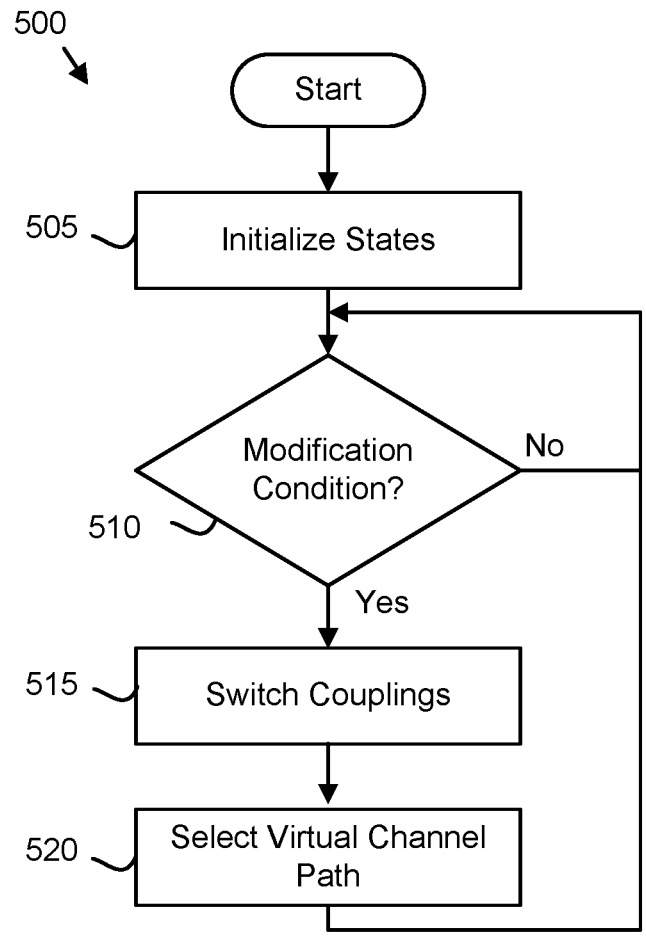
FIG. 7 is a schematic flow chart diagram illustrating one embodiment of a router modification method.

FIG. 7 is a schematic flow chart diagram illustrating one embodiment of a router modification method 500. The method 500 may perform functions of the NoC and/or the apparatus 400. The method 500 may be performed by one or more semiconductor circuits. The semiconductor circuits may include logic circuits, registers, latches, multiplexers, sequencers, data stores, and the like.

The method 500 starts, and in one embodiment the apparatus 400 initializes 505 states of the coupling module 405, the connection module 410, the idle module 415, and the condition module 420. For example, the coupling module 405 may store an initial multiplexer selection such as a multiplexer selection of 0 for the multiplexers 135 of the input buffers 115. In addition, the connection module 410 may select initial virtual channel paths 170 for each of the decoders 175 in the selector 145. For example, the connection module 410 may select a first north virtual channel 180Na for the north decoder 175N, a first south virtual channel 180Sa for the south decoder 175S, a first east virtual channel 180Ea for the east decoder 175E, and a first west virtual channel 180Wa for the west decoder 175W.

In one embodiment, the idle module 415 may select the aging optimized value 205. In one embodiment, the aging optimized value 205 is selected from a plurality of values based on a forecast of operations performed by the NoC 100. Each of the values may be determined during an off-line analysis to reduce transistor aging for a particular type of operation.

In one embodiment, the condition module 420 initiate an epoch. The epoch may be initiated by starting an epoch timer, zeroing a data counter, or zeroing a clock cycle counter.

The condition module 420 determines 510 if the modification condition is satisfied. In one embodiment, the modification condition is an epoch boundary. The modification condition may be satisfied when the epoch boundary is reached. For example, the modification condition may be satisfied in the end of each epoch.

If the modification condition is not satisfied, the condition module 420 continues to determine 510 when the modification condition is satisfied. If the modification condition is satisfied, the coupling module 405 switches 515 the couplings of input buffer data bits 125 to the switch 120 and/or the connecting wires 110 in the NoC data channel 111. In one embodiment, the coupling module 405 may switch 515 the couplings by changing the multiplexer selection for the multiplexers 135 as described for FIG. 3.

The connection module 410 may select 520 the virtual channel path 170 to the connection points 150 and the connecting wires 110 and/or switch 120. The connection points 150 may be modified according to a specified schedule such as illustrated in Table 2. Alternatively, the connections of decoders 175 to connection points 150 may be randomly selected.

The method 500 may loop to continue determining 510 if the modification condition is satisfied, thus regularly switching 515 the couplings of input buffer data bits 125 to the switch 120 and/or the connecting wires 110 and regularly switching 520 virtual channel path 170 to the connection points 150 and to the connecting wires 110 and/or switch 120. As a result, HCI and transistor aging is reduced.

Figure 8:
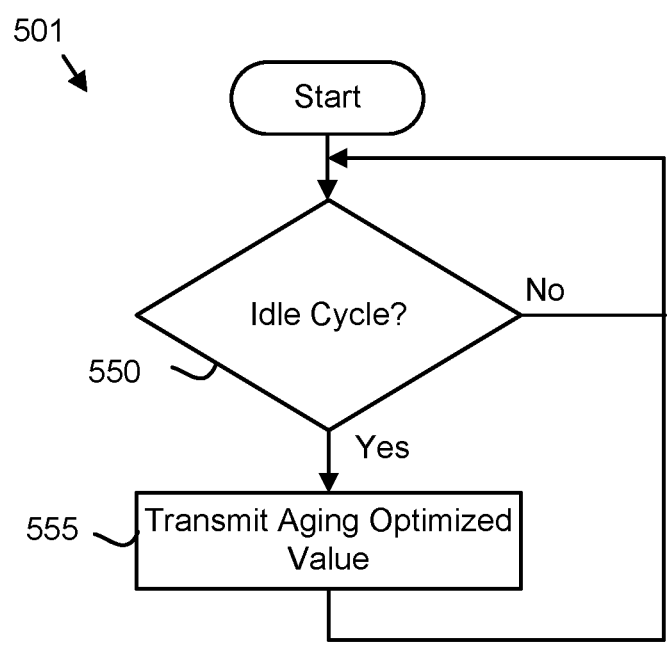
FIG. 8 is a schematic flow chart diagram illustrating one embodiment of an idle cycle modification method.

FIG. 8 is a schematic flow chart diagram illustrating one embodiment of an idle cycle modification 501.

The idle module 415 may detect 550 an idle cycle for an element such as input buffer 115, decoder 175, virtual channel 180, element of the switch 120, and/or connecting wire 110. An idle cycle may be one or more clock cycles during which no data value is transferred through a monitored element. If no idle cycle is detected, the idle module 415 may cause the idle value selector 215 to select the value of idle input 210 as the idle output 220 and the idle module 415 may continue to monitor for idle cycles.

If the idle module 415 detects 550 the idle cycle for the monitored element, the idle module 415 may transmit 555 the age optimizing value 205 in place of an idle data value to the monitored element in response to detecting the idle cycle for the monitored element. In one embodiment, the idle module 415 may cause the idle value selector 215 to select the age optimizing value 205 as the idle output 220.

For example, if the idle module 415 detects 550 the idle cycle for an input buffer 115, the idle module 415 may transmit 555 the age optimizing value 205 from the input buffer 115 in place of the idle values of the shuffled input buffer data bits 155. By transmitting the age optimizing value 205 during idle cycles, HCI and transistor aging are further minimized. As a result, the NoC 100 is more tolerant of HCI.

Figure 9A:
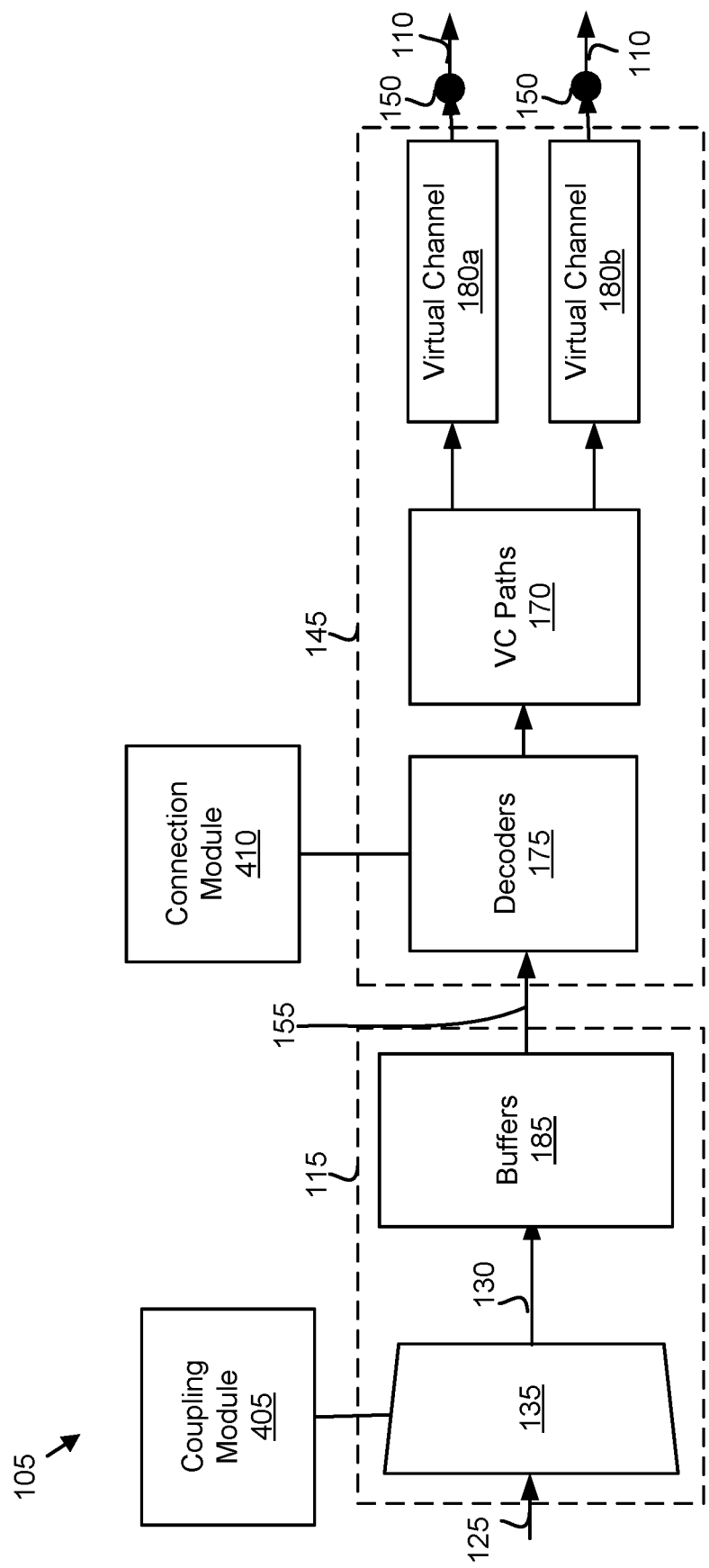
FIG. 9A is a schematic block diagram illustrating one embodiment of a node.

FIG. 9A is a schematic block diagram illustrating one embodiment of a node 105 showing the operation of the input buffers 115 and the selector 145 with the coupling module 405 and the connection module 410. The plurality of input buffers 115 may receive a plurality of input buffer data bits 125. The multiplexers 135 may shuffle the plurality of input buffer data bits 125 to output multiplexer outputs 130. In one embodiment, the plurality of input buffer data bits 125 are received as input buffer data bit groups 125a-d. The multiplexer outputs 130 may be buffered by the buffers 185 and output as shuffled input data bits 155. One embodiment of the shuffled input data bits 155 is described in Table 1.

In one embodiment, the coupling module 405 switches first input buffer data bits 125 of the plurality of input buffer data bits 125 at the plurality of input buffers 115 from first shuffled input buffer data bits 155 to second shuffled input buffer data bits 155 using the multiplexers 135 in response to reaching an end of a time interval. The time interval may be an epoch and the end of the time interval may be an epoch boundary. The coupling module 405 may switch the first input buffer data bits 125 from first shuffled input buffer data bits 155 to second shuffled input buffer data bits 155 to reduce hot carrier injection for the node 105.

The selector 145 may receive the plurality of shuffled input buffer data bits 155 at one or more decoders 175 and may select, using the one or more decoders 175, a virtual channel path 170 to a virtual channel 180 of the plurality of virtual channels 180 for the shuffled input buffer data bits 155. The virtual channels 180 connect to connection points 150 that each connect to one connecting wire 110.

In one embodiment, the connection module 410 switches the second shuffled input buffer data bits 155 from a first virtual channel 180a to a second virtual channel 180b of the plurality of virtual channels 180 using the decoders 175. The connection module 410 may switch the second shuffled input buffer data bits 155 from a first virtual channel 180a to a second virtual channel 180b in response to reaching the end of the time interval. The switching of the second shuffled input buffer data bits 155 from a first virtual channel 180a to a second virtual channel 180b may reduce the hot carrier injection for the node 105.

Figure 9B:
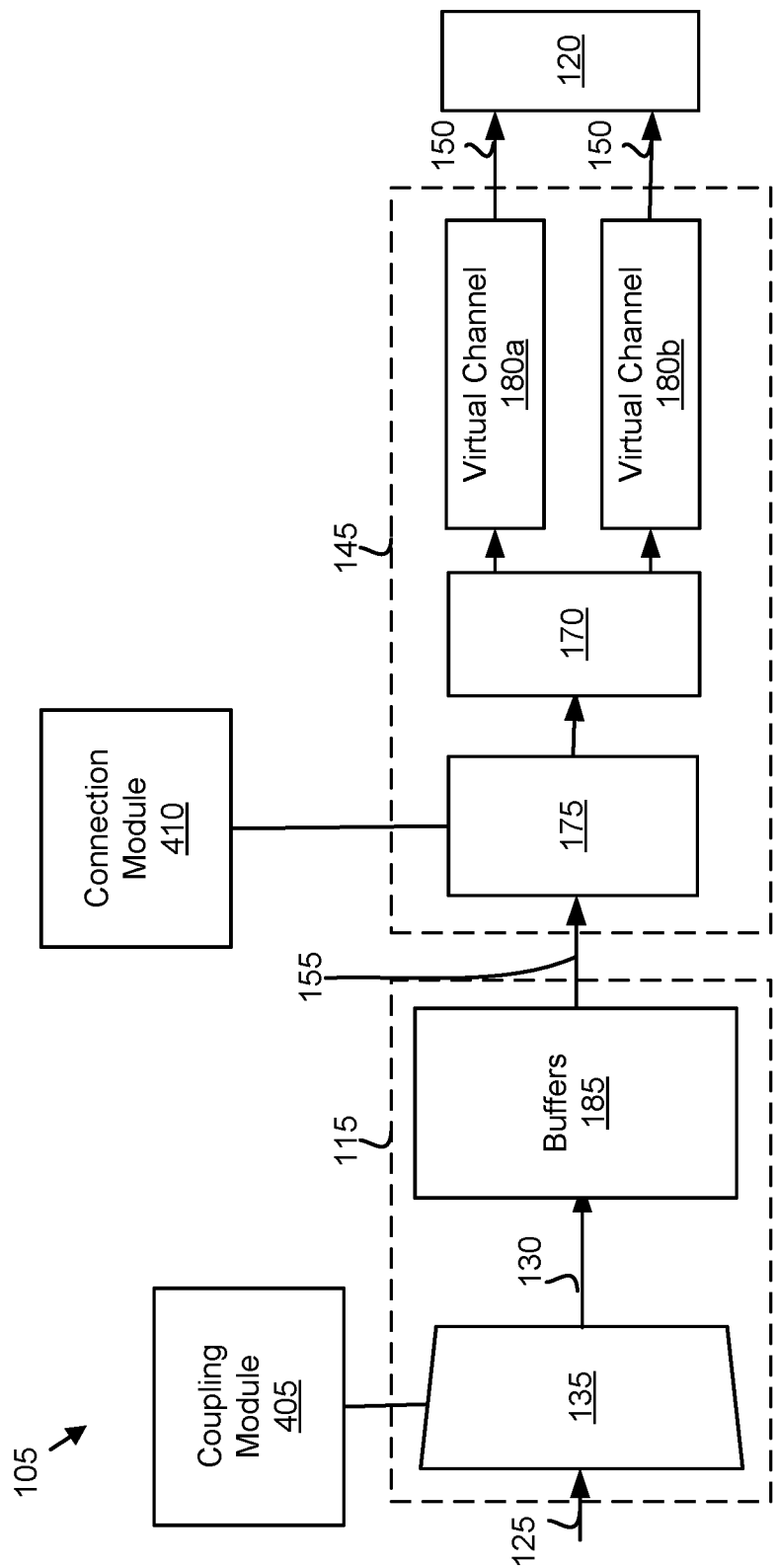
FIG. 9B is a schematic block diagram illustrating one embodiment of a node and switch.

FIG. 9B is a schematic block diagram illustrating one embodiment of a node 105 and switch 120 showing the operation of the input buffers 115 and the selector 145 with the coupling module 405 and the connection module 410. The plurality of input buffers 115 may receive a plurality of input buffer data bits 125. The multiplexers 135 may shuffle the plurality of input buffer data bits 125 to output multiplexer outputs 130. In one embodiment, the plurality of input buffer data bits 125 are received as input buffer data bit groups 125a-d. The multiplexer outputs 130 may be buffered by the buffers 185 and output as shuffled input data bits 155. One embodiment of the shuffled input data bits 155 is described in Table 1.

In one embodiment, the coupling module 405 switches first input buffer data bits 125 of the plurality of input buffer data bits 125 at the plurality of input buffers 115 from first shuffled input buffer data bits 155 to second shuffled input buffer data bits 155 using the multiplexers 135 in response to reaching an end of the time interval. The time interval may be an epoch and the end of the time interval may be an epoch boundary. The coupling module 405 may switch the first input buffer data bits 125 from first shuffled input buffer data bits 155 to second shuffled input buffer data bits 155 to reduce hot carrier injection for the node 105.

The selector 145 may receive the plurality of shuffled input buffer data bits 155 at one or more decoders 175 and may select, using the one or more decoders 175, a virtual channel path 170 to a virtual channel 180 of the plurality of virtual channels 180 for the shuffled input buffer data bits 155. The virtual channels 180 connect to connection points 150 that each connect to the switch 120.

In one embodiment, the connection module 410 switches the second shuffled input buffer data bits 155 from a first virtual channel 180a to a second virtual channel 180b of the plurality of virtual channels 180 using the decoders 175. The connection module 410 may switch the second shuffled input buffer data bits 155 from a first virtual channel 180a to a second virtual channel 180b in response to reaching the end of the time interval. The switching of the second shuffled input buffer data bits 155 from a first virtual channel 180a to a second virtual channel 180b may reduce the hot carrier injection for the node 105.

Figure 9C:
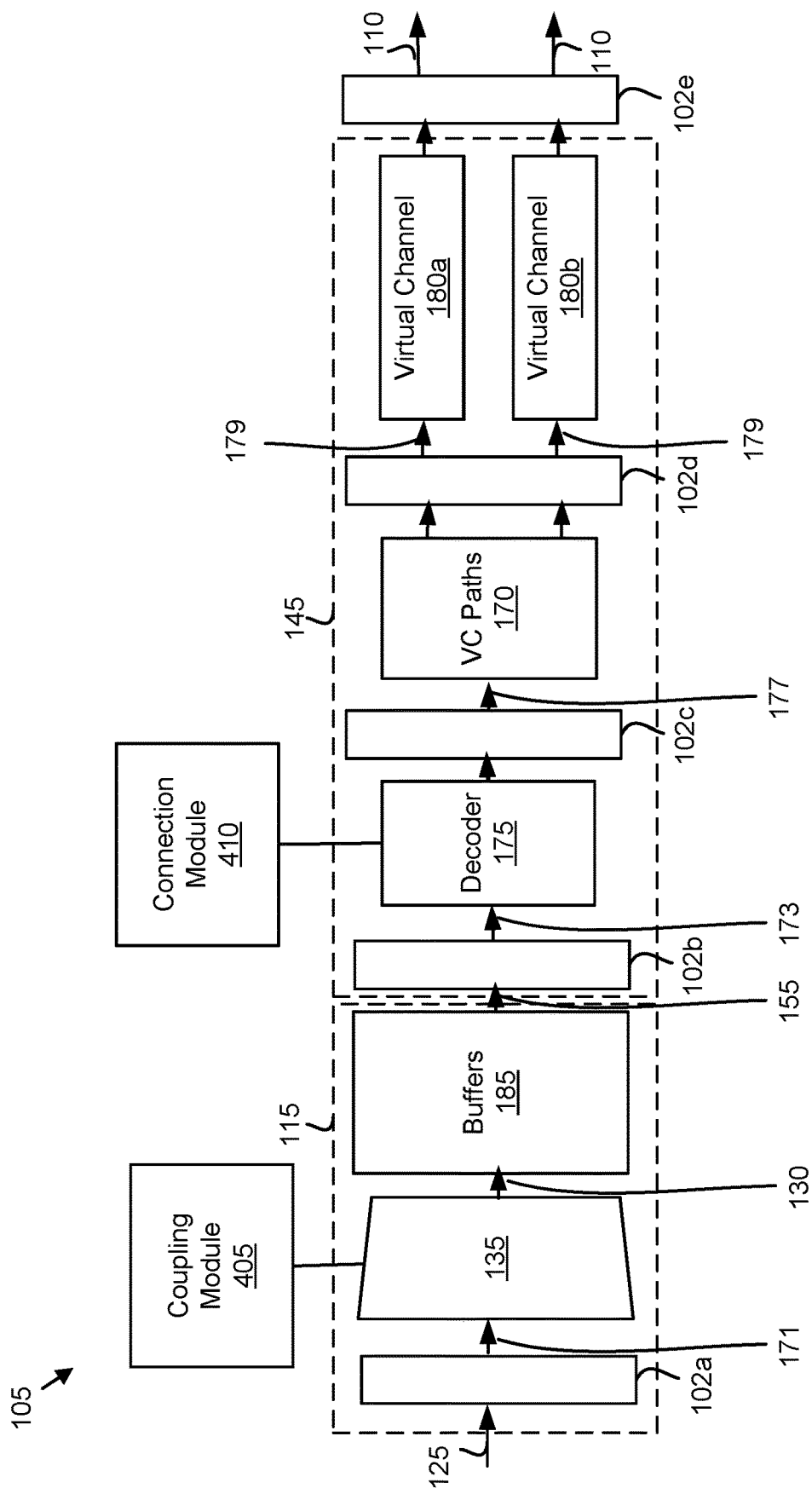
FIG. 9C is a schematic block diagram illustrating one embodiment of a node with idle circuits.

FIG. 9C is a schematic block diagram illustrating one embodiment of a node 105 with idle circuits 102. First idle circuits 102a that include the input buffers 115 may receive a plurality of input buffer data bits 125 and may transmit one of the input buffer data bits 125 or the aging optimized value 205 as input values 171 to the multiplexers 130. The multiplexers 135 shuffle the input values 171 and output multiplexer outputs 130. The multiplexer outputs 130 may be buffered by the buffers 185 and output as shuffled input data bits 155. One embodiment of the shuffled input data bits 155 is described in Table 1.

In one embodiment, the coupling module 405 switches the input values 171 from first shuffled input buffer data bits 155 to second shuffled input buffer data bits 155 using the multiplexers 135 in response to reaching the end of the time interval. The coupling module 405 may switch the first input buffer data bits 125 from first shuffled input buffer data bits 155 to second shuffled input buffer data bits 155 to reduce hot carrier injection for the node 105.

Second idle circuits 102b may receive the shuffled input buffer data bits 155 and transmit one of the shuffled input buffer data bits 155 or aging optimized values 205 as shuffled values 173 to one or more decoders 175. The one or more decoders 175 may select a virtual channel path 170 for the shuffled values 173. Third idle circuits 102c may receive the shuffled values 173 and transmit one of the shuffled values 173 or aging optimized values 205 as decoder values 177 to the selected virtual channel path 170. Fourth idle circuits 102d may receive the decoder values 177 and transmit one of the decoder values 177 or aging optimized values 205 as channel values 179 to a virtual channel 180 of the plurality of virtual channels 180. The virtual channels 180 connect to fifth idle circuits 102e that receive the channel values 179 and transmit one of the channel values 179 or aging optimized values 205 to the connecting wires 110.

In one embodiment, the connection module 410 switches the second shuffled input buffer data bits 155 from a first virtual channel 180a to a second virtual channel 180b of the plurality of virtual channels 180 using the decoders 175. The connection module 410 may switch the second shuffled input buffer data bits 155 from a first virtual channel 180a to a second virtual channel 180b in response to reaching the end of the time interval. The switching of the second shuffled input buffer data bits 155 from a first virtual channel 180a to a second virtual channel 180b may reduce the hot carrier injection for the node 105. While five idle circuits 102*a-e* are shown, any or all idle circuits 102*a-e* may be omitted.

Figure 9D:
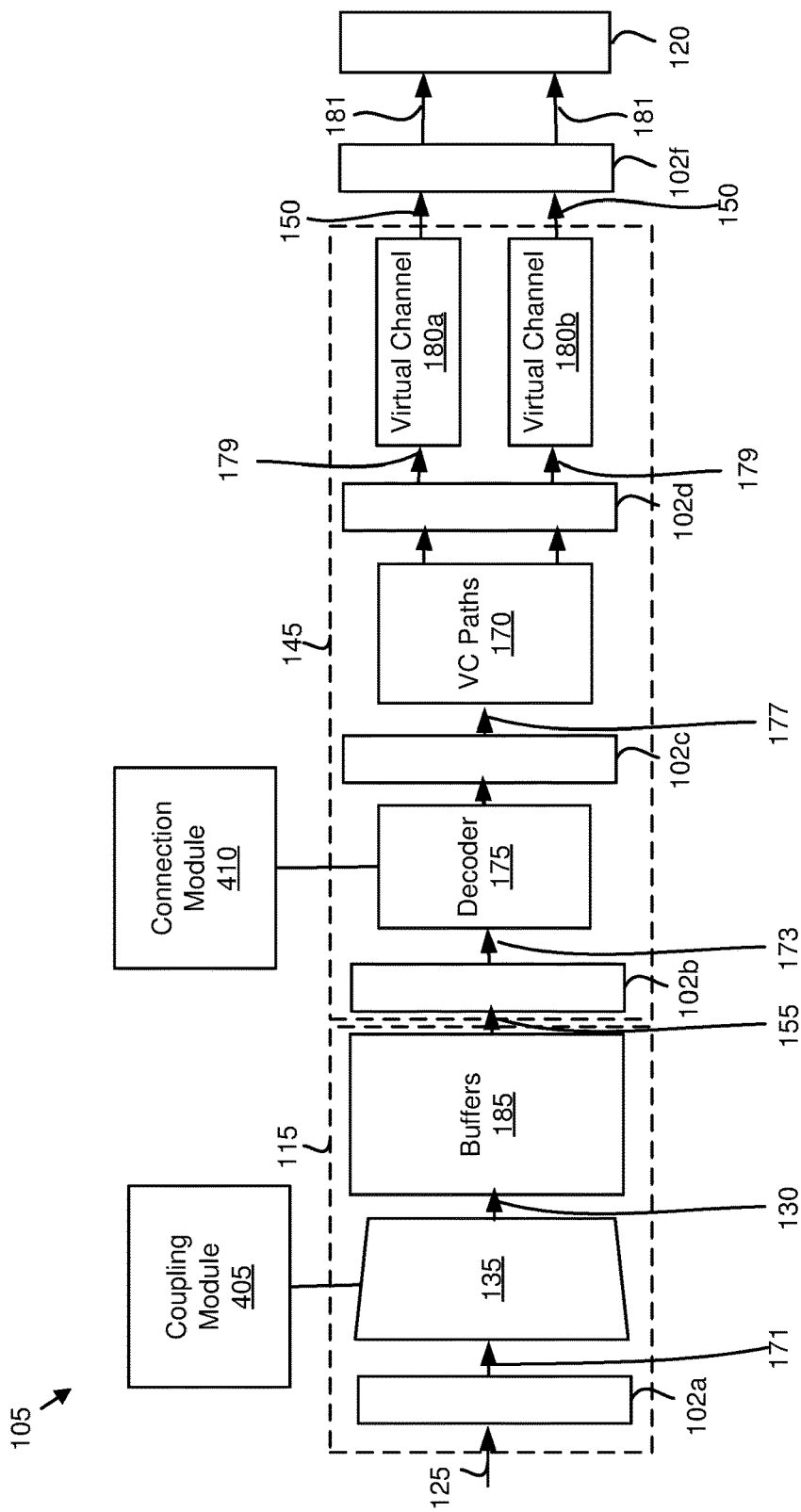
FIG. 9D is a schematic block diagram illustrating one alternate embodiment of node with idle circuits.

FIG. 9D is a schematic block diagram illustrating one alternate embodiment of node 105 with idle circuits 102. First idle circuits 102*a* that include the input buffers 115 may receive a plurality of input buffer data bits 125 and may transmit one of the input buffer data bits 125 or the aging optimized value 205 as input values 171 to the multiplexers 130. The multiplexers 135 shuffle the input values 171 and output multiplexer outputs 130. The multiplexer outputs 130 may be buffered by the buffers 185 and output as shuffled input data bits 155. One embodiment of the shuffled input data bits 155 is described in Table 1.

In one embodiment, the coupling module 405 switches the input values 171 from first shuffled input buffer data bits 155 to second shuffled input buffer data bits 155 using the multiplexers 135 in response to reaching the end of the time interval. The coupling module 405 may switch the first input buffer data bits 125 from first shuffled input buffer data bits 155 to second shuffled input buffer data bits 155 to reduce hot carrier injection for the node 105.

Second idle circuits 102*b* may receive the shuffled input buffer data bits 155 and transmit one of the shuffled input buffer data bits 155 or aging optimized values 205 as shuffled values 173 to one or more decoders 175. The one or more decoders 175 may select a virtual channel path 170 for the shuffled values 173. Third idle circuits 102*c* may receive the shuffled values 173 and transmit one of the shuffled values 173 or aging optimized values 205 as decoder values 177 to the selected virtual channel path 170. Fourth idle circuits 102*d* may receive the decoder values 177 and transmit one of the decoder values 177 or aging optimized values 205 as channel values 179 to a virtual channel 180 of the plurality of virtual channels 180. The virtual channels 180 connect to fifth idle circuits 102*f* that receive the channel values 179 and transmit one of the channel values 179 or aging optimized values 205 as channel values 181 to the switch 120.

In one embodiment, the connection module 410 switches the second shuffled input buffer data bits 155 from a first virtual channel 180*a* to a second virtual channel 180*b* of the plurality of virtual channels 180 using the decoders 175. The connection module 410 may switch the second shuffled input buffer data bits 155 from a first virtual channel 180*a* to a second virtual channel 180*b* in response to reaching the end of the time interval. The switching of the second shuffled input buffer data bits 155 from a first virtual channel 180*a* to a second virtual channel 180*b* may reduce the hot carrier injection for the node 105. While five idle circuits 102*a-e* are shown, any or all idle circuits 102*a-e* may be omitted.

Figure 10A:
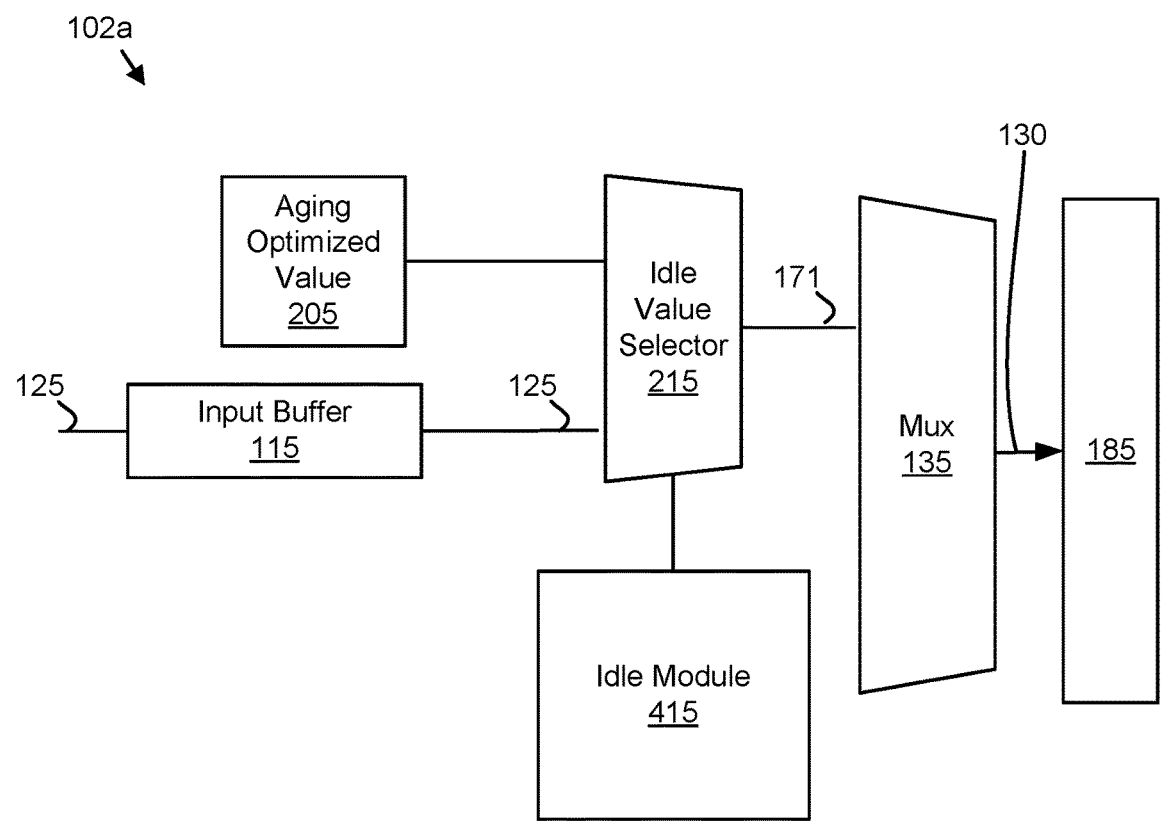
FIG. 10A is a schematic block diagram illustrating one embodiment of an input buffer, multiplexer, and idle circuit.

FIG. 10A is a schematic block diagram illustrating one embodiment of the input buffer 115, the multiplexer 135, and the idle circuit 102 forming the first idle circuit 102*a* of FIGS. 9C-D. The idle value selector 215 may transmit one of the input buffer data bit 125 or the aging optimized value 205 as an input value 171 to the multiplexer 130. The idle module 415 may detect an idle cycle for the input buffer data bit 125. In one embodiment, the idle module 415 detects the idle cycle when no active data values are transmitted in the input buffer data bits 125. In response to detecting the idle cycle, the idle module 415 may direct the idle value selector 215 to transmit the aging optimized value 205 to the multiplexer 135 as the input value 171. Otherwise, the idle value selector 215 may transmit the input buffer data bit 125 as the input value 171.

Figure 10B:
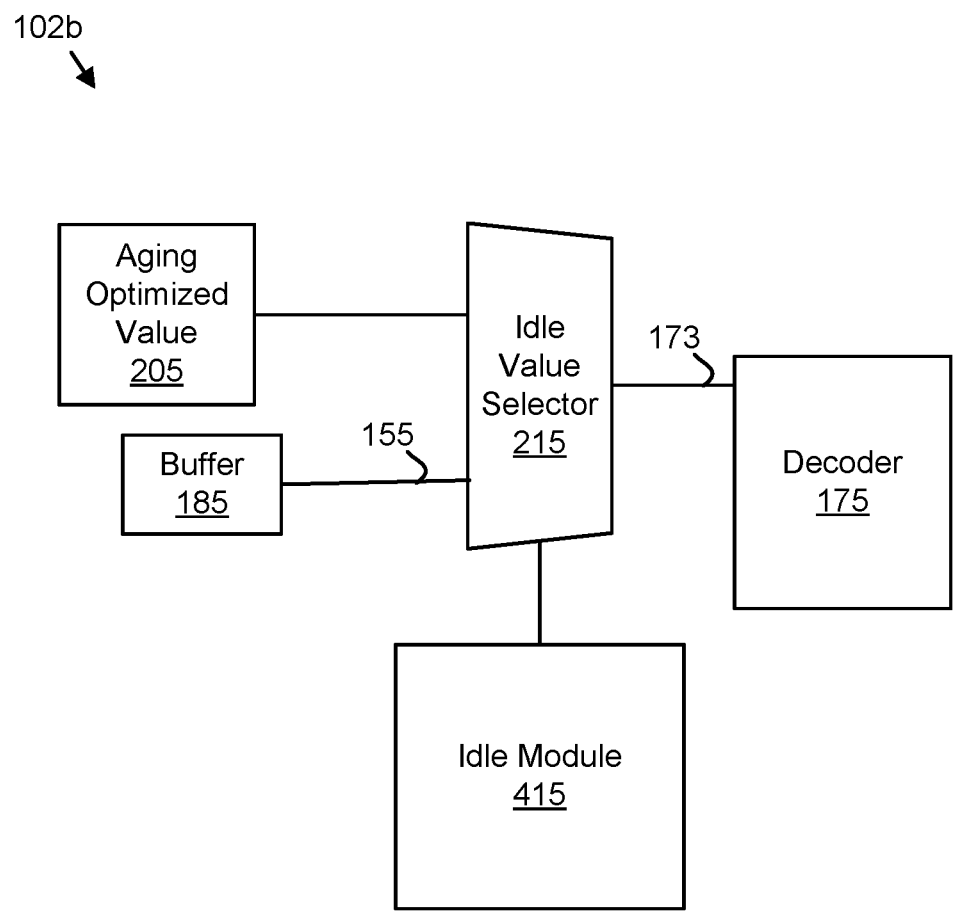
FIG. 10B is a schematic block diagram illustrating one embodiment of a buffer, decoder, and idle circuit.

FIG. 10B is a schematic block diagram illustrating one embodiment of the buffer 185, the decoder 175, and idle circuit 102 forming the second idle circuit 102*b* of FIGS. 9C-D. The idle value selector 215 may transmit one of the shuffled input buffer data bit 155 or the aging optimized value 205 as a shuffled value 173 to the decoder 175. The idle module 415 may detect an idle cycle for the shuffled input buffer data bit 155. In one embodiment, the idle module 415 detects the idle cycle when no active data values are transmitted in the shuffled input buffer data bit 155. In response to detecting the idle cycle, the idle module 415 may direct the idle value selector 215 to transmit the aging optimized value 205 to the decoder 175 as the shuffled value 173. Otherwise, the idle value selector 215 may transmit the shuffled input buffer data bit 155 as the shuffled value 173.

Figure 10C:
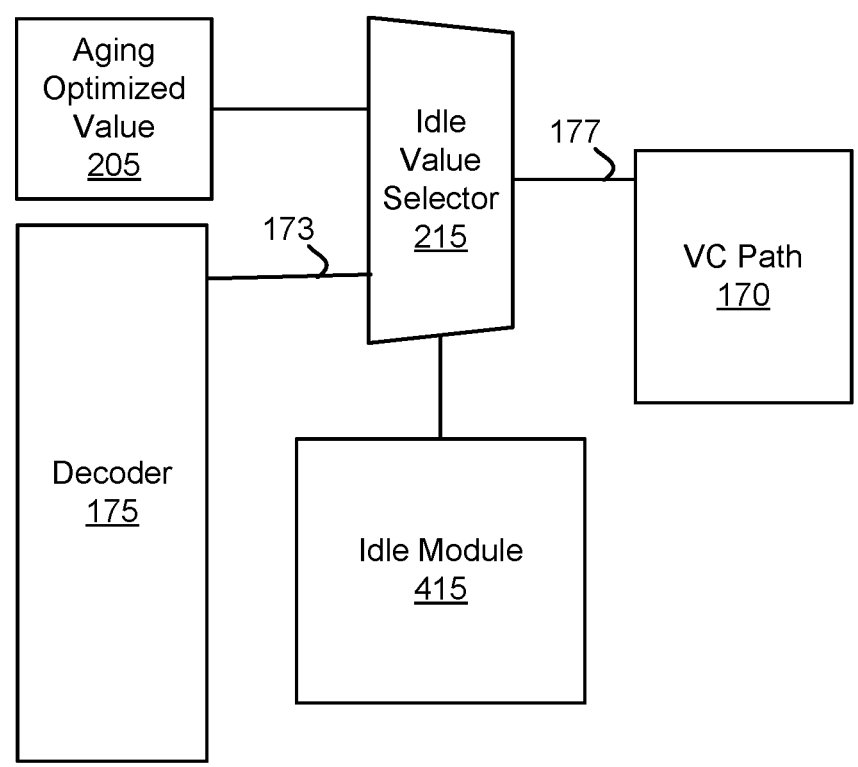
FIG. 10C is a schematic block diagram illustrating one embodiment of a decoder, virtual channel path, and idle circuit.

FIG. 10C is a schematic block diagram illustrating one embodiment of the decoder 175, the virtual channel path 170, and idle circuit 102 forming the third idle circuit 102*c* of FIGS. 9C-D. The idle value selector 215 may transmit one of the shuffled value 173 or the aging optimized value 205 as a decoder value 177 to the virtual channel path 170. The idle module 415 may detect an idle cycle for the shuffled value 173. In one embodiment, the idle module 415 detects the idle cycle when no active data values are transmitted in the shuffled value 173. In response to detecting the idle cycle, the idle module 415 may direct the idle value selector 215 to transmit the aging optimized value 205 to the virtual channel path 170 as the decoder value 177. Otherwise, the idle value selector 215 may transmit the shuffled value 173 as the decoder value 177.

Figure 10D:
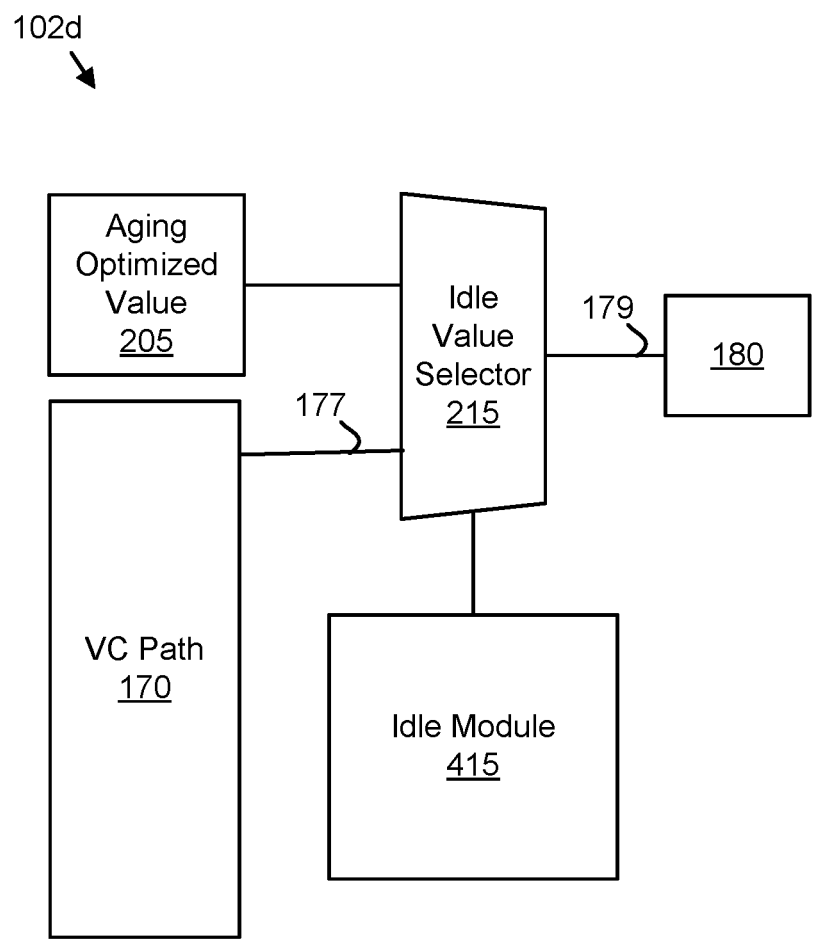
FIG. 10D is a schematic block diagram illustrating one embodiment of a virtual channel path, a virtual channel, and idle circuit.

FIG. 10D is a schematic block diagram illustrating one embodiment of the virtual channel path 170, the virtual channel 180, and idle circuit 102 forming the fourth idle circuit 102*d* of FIGS. 9C-D. The idle value selector 215 may transmit one of the decoder value 177 or the aging optimized value 205 as a channel value 179 to the virtual channel 180. The idle module 415 may detect an idle cycle for the decoder value 177. In one embodiment, the idle module 415 detects the idle cycle when no active data values are transmitted in the decoder value 177. In response to detecting the idle cycle, the idle module 415 may direct the idle value selector 215 to transmit the aging optimized value 205 to the virtual channel 180 as the channel value 179. Otherwise, the idle value selector 215 may transmit the decoder value 177 as the channel value 179.

Figure 10E:
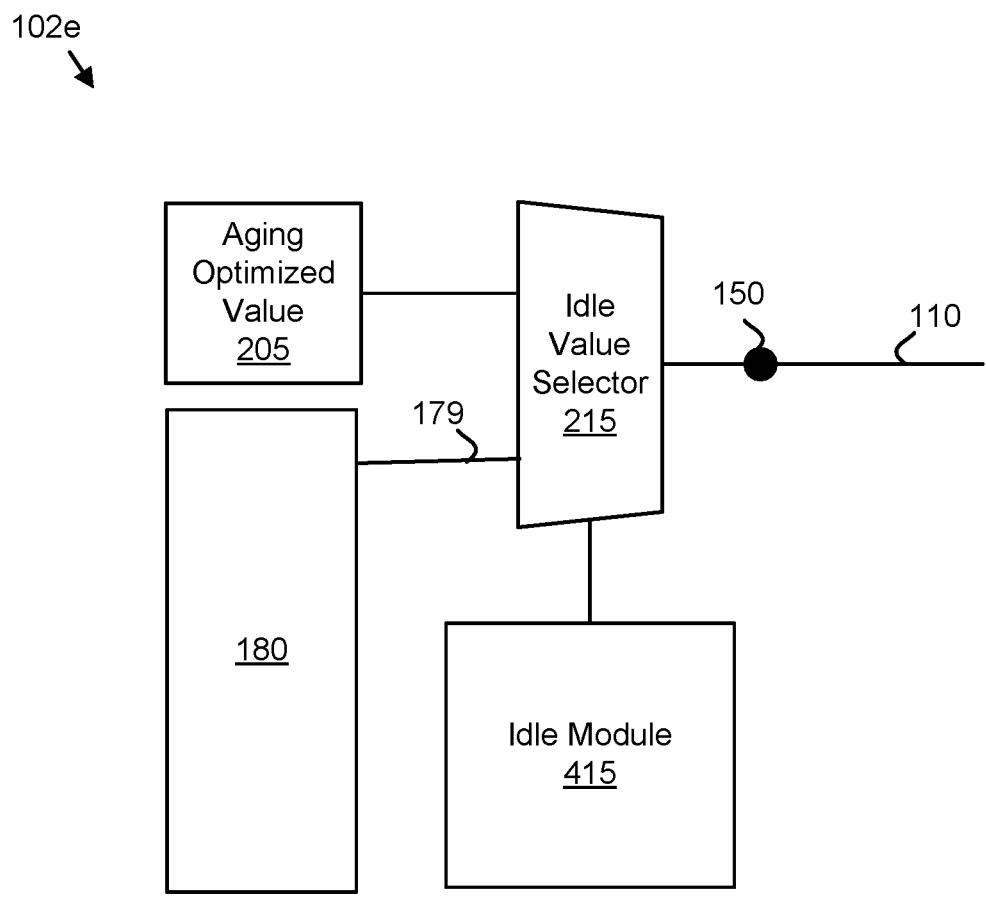
FIG. 10E is a schematic block diagram illustrating one embodiment of a virtual channel and idle circuit.

FIG. 10E is a schematic block diagram illustrating one embodiment of the virtual channel 180 and the idle circuit 102 forming the fifth idle circuit 102*e* of FIG. 9C. The idle value selector 215 may transmit one of the channel value 179 or the aging optimized value 205 to the connecting wire 110 through the connection point 150. The idle module 415 may detect an idle cycle for the channel value 179. In one embodiment, the idle module 415 detects the idle cycle when no active data values are transmitted in the channel value 179. In response to detecting the idle cycle, the idle module 415 may direct the idle value selector 215 to transmit the aging optimized value 205 to the connecting wire 110. Otherwise, the idle value selector 215 may transmit the channel value 179 to the connecting wire 110.

Figure 10F:
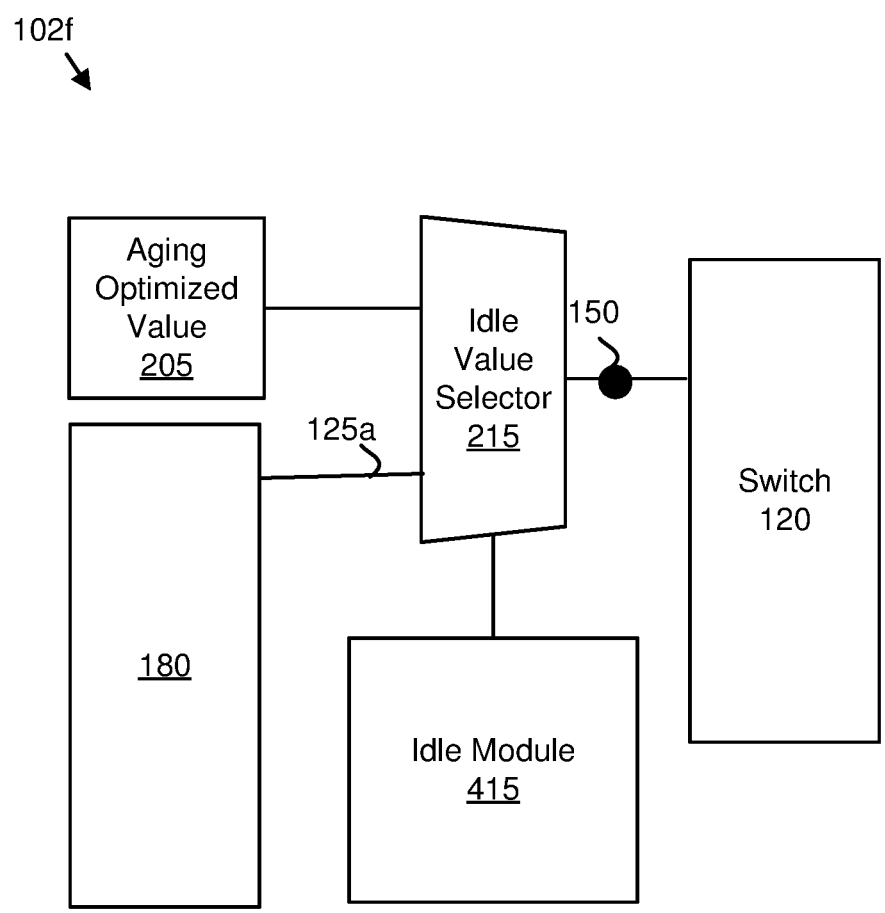
FIG. 10F is a schematic block diagram illustrating one embodiment of a virtual channel, switch, and idle circuit.

FIG. 10F is a schematic block diagram illustrating one embodiment of the virtual channel 180, the switch 120, and the idle circuit 102 forming the fifth idle circuit 102*e* of FIG. 9D. The idle value selector 215 may transmit one of the channel value 179 or the aging optimized value 205 to the switch 120 through the connection point 150. The idle module 415 may detect an idle cycle for the channel value 179. In one embodiment, the idle module 415 detects the idle cycle when no active data values are transmitted in the channel value 179. In response to detecting the idle cycle, the idle module 415 may direct the idle value selector 215 to transmit the aging optimized value 205 to the switch 120. Otherwise, the idle value selector 215 may transmit the channel value 179 to the switch 120.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a plurality of input buffers that receives a plurality of input buffer data bits;
   a plurality of multiplexers that shuffles the plurality of input buffer data bits to output multiplexer outputs, wherein the multiplexer outputs are buffered by a plurality of buffers to output a plurality of shuffled input buffer data bits;
   a coupling module comprising semiconductor gates that switches first input buffer data bits of the plurality of input buffer data bits at the plurality of input buffers from first shuffled input buffer data bits to second shuffled input buffer data bits using the plurality of multiplexers in response to reaching an end of a time interval to reduce hot carrier injection for the apparatus;
   a selector comprising semiconductor gates that receives the plurality of shuffled input buffer data bits at a plurality of decoders and selects, using the plurality of decoders, a virtual channel path to a virtual channel of the plurality of virtual channels for the shuffled input buffer data bits;
   a connection module comprising semiconductor gates that switches the second shuffled input buffer data bits from a first virtual channel to a second virtual channel of the plurality of virtual channels using the plurality of decoders in response to reaching the end of the time interval to reduce the hot carrier injection for the apparatus.

2. The apparatus of claim 1, the apparatus further comprising an idle module that:
   detects an idle cycle for the plurality of input buffers; and
   transmits an aging optimized value from an idle value selector multiplexer for each of the plurality of input buffer data bits in response to detecting the idle cycle, wherein the aging optimized value reduces transistor aging relative to an idle value of the plurality of input buffer data bits.

3. The apparatus of claim 2, wherein the aging optimized value is identified from an off-line analysis of traffic within the apparatus.

4. The apparatus of claim 1, the apparatus further comprising an idle module that:
   detects an idle cycle for the plurality of decoders; and
   transmits an aging optimized value from an idle value selector multiplexer for each of the plurality of shuffled input buffer data bits in response to detecting the idle cycle, wherein the aging optimized value reduces transistor aging relative to an idle value of the plurality of shuffled input buffer data bits.

5. The apparatus of claim 1, wherein the apparatus further comprises a plurality of connection points and one of a connection wire and a switch connected to each connection point.

6. The apparatus of claim 5, the apparatus further comprising an idle module that:
   detects an idle cycle for the plurality of connection points; and
   transmits an aging optimized value from an idle value selector multiplexer from the plurality of connection points in response to detecting the idle cycle, wherein the aging optimized value reduces transistor aging relative to an idle value of the plurality of connection points.

7. The apparatus of claim 1, wherein the input buffer data bits are shuffled in groups of eight bits.

8. A method for network on chip (NoC) routing comprising:
   switching, by use of semiconductor gates first input buffer data bits of a plurality of input buffer data bits received at a plurality of input buffers from first shuffled input buffer data bits to second shuffled input buffer data bits using a plurality of multiplexers and a plurality of buffers in response to reaching an end of a time interval to reduce hot carrier injection for a network on chip (NoC) node comprising the plurality of input buffers, the plurality of multiplexers, a coupling module, a selector, and a connection module; and
   switching the second shuffled input buffer data bits from a first virtual channel to a second virtual channel of a plurality of virtual channels that connect to a plurality of virtual channels using a plurality of decoders in response to reaching the end of the time interval to reduce the hot carrier injection for the NoC node.

9. The method of claim 8, the method further:
   detecting an idle cycle for the plurality of input buffers; and
   transmitting an aging optimized value from an idle value selector multiplexer for each of the plurality of input buffer data bits in response to detecting the idle cycle, wherein the aging optimized value reduces transistor aging relative to an idle value of the plurality of input buffer data bits.

10. The method of claim 9, wherein the aging optimized value is identified from an off-line analysis of traffic within the NoC node.

11. The method of claim 8, the method further:
    detecting an idle cycle for the plurality of decoders; and
    transmitting an aging optimized value from an idle value selector multiplexer for each of the plurality of shuffled input buffer data bits in response to detecting the idle cycle, wherein the aging optimized value reduces transistor aging relative to an idle value of the plurality of shuffled input buffer data bits.

12. The method of claim 8, wherein the NoC node further comprises a plurality of connection points and one of a connection wire and a switch connected to each connection point.

13. The method of claim 12, the method further:
    detecting an idle cycle for the plurality of connection points; and
    transmitting an aging optimized value from an idle value selector multiplexer from the plurality of connection points in response to detecting the idle cycle, wherein the aging optimized value reduces transistor aging relative to an idle value of the plurality of connection points.

14. The method of claim 8, wherein the input buffer data bits are shuffled in groups of eight bits.

15. A network on chip (NoC) node comprising:
    a plurality of input buffers that receives a plurality of input buffer data bits;

a plurality of multiplexers that shuffles the plurality of input buffer data bits to output multiplexer outputs, wherein the multiplexer outputs are buffered by a plurality of buffers to output a plurality of shuffled input buffer data bits;

a coupling module comprising semiconductor gates that switches first input buffer data bits of the plurality of input buffer data bits at the plurality of input buffers from first shuffled input buffer data bits to second shuffled input buffer data bits using the plurality of multiplexers in response to reaching an end of a time interval to reduce hot carrier injection for the NoC node;

a selector comprising semiconductor gates that receives the plurality of shuffled input buffer data bits at a plurality of decoders and selects, using the plurality of decoders, a virtual channel path to a virtual channel of the plurality of virtual channels for the shuffled input buffer data bits;

a connection module comprising semiconductor gates that switches the second shuffled input buffer data bits from a first virtual channel to a second virtual channel of the plurality of virtual channels using the plurality of decoders in response to reaching the end of the time interval to reduce the hot carrier injection for the NoC node.

16. The NoC node of claim 15, the NoC node further comprising an idle module that:

detects an idle cycle for the plurality of input buffers; and
transmits an aging optimized value from an idle value selector multiplexer for each of the plurality of input buffer data bits in response to detecting the idle cycle, wherein the aging optimized value reduces transistor aging relative to an idle value of the plurality of input buffer data bits.

17. The NoC node of claim 16, wherein the aging optimized value is identified from an off-line analysis of traffic within the NoC node.

18. The NoC node of claim 15, the NoC node further comprising an idle module that:

detects an idle cycle for the plurality of decoders; and
transmits an aging optimized value from an idle value selector multiplexer for each of the plurality of shuffled input buffer data bits in response to detecting the idle cycle, wherein the aging optimized value reduces transistor aging relative to an idle value of the plurality of shuffled input buffer data bits.

19. The NoC node of claim 15, wherein the NoC node further comprises a plurality of connection points and one of a connection wire and a switch connected to each connection point.

20. The NoC node of claim 19, the NoC node further comprising an idle module that:

detects an idle cycle for the plurality of connection points; and
transmits an aging optimized value from an idle value selector multiplexer from the plurality of connection points in response to detecting the idle cycle, wherein the aging optimized value reduces transistor aging relative to an idle value of the plurality of connection points.

* * * * *